United States Patent
Chan et al.

(10) Patent No.: US 12,493,362 B1
(45) Date of Patent: Dec. 9, 2025

(54) AUTOCOMPLETING DATA FIELDS BASED ON INTERACTION WITH A PERSON

(71) Applicant: Apple Inc., Cupertino, CA (US)

(72) Inventors: Ada Y. Chan, Cupertino, CA (US); Chelsea E. Pugh, San Francisco, CA (US); Adele C. Peterson, Los Gatos, CA (US)

(73) Assignee: APPLE INC., Cupertino, CA (US)

( * ) Notice: Subject to any disclaimer, the term of this patent is extended or adjusted under 35 U.S.C. 154(b) by 285 days.

(21) Appl. No.: 17/886,138

(22) Filed: Aug. 11, 2022

Related U.S. Application Data (60) Provisional application No. 63/247,942, filed on Sep. 24, 2021.

(51) Int. Cl.
G06F 40/174 (2020.01)
G06F 3/023 (2006.01)
G06F 3/0481 (2022.01)

(52) U.S. Cl.
CPC .......... *G06F 3/0237* (2013.01); *G06F 3/0481* (2013.01); *G06F 40/174* (2020.01)

(58) Field of Classification Search
CPC .... G06F 3/0237; G06F 3/0481; G06F 40/174; G10L 17/26
USPC ....... 382/118; 704/723, 270.1; 715/224, 225
See application file for complete search history.

(56) References Cited

U.S. PATENT DOCUMENTS

| | | | | |
|---|---|---|---|---|
| 7,660,779 | B2* | 2/2010 | Goodman | G06F 40/174 715/224 |
| 8,839,090 | B2* | 9/2014 | Boss | G06F 16/9535 715/224 |
| 9,218,332 | B2 | 12/2015 | Bhatia et al. | |
| 9,672,575 | B2* | 6/2017 | Chandran | G06Q 50/01 |
| 10,073,826 | B2 | 9/2018 | Ramesan | |
| 11,502,862 | B2* | 11/2022 | Fagundes | G06V 40/172 |
| 11,907,281 | B2* | 2/2024 | Hwang | G06F 16/583 |
| 2003/0028792 | A1* | 2/2003 | Plow | G06Q 30/02 715/744 |
| 2014/0123057 | A1* | 5/2014 | Eigner | H04W 4/08 715/780 |
| 2015/0154002 | A1* | 6/2015 | Weinstein | G06F 9/451 715/728 |
| 2015/0205776 | A1* | 7/2015 | Bhatia | G06Q 30/02 715/224 |
| 2016/0260435 | A1* | 9/2016 | Baard | H04M 1/575 |

(Continued)

*Primary Examiner* — Abul K Azad
(74) *Attorney, Agent, or Firm* — Fernando & Partners, LLP (57) ABSTRACT

Various implementations disclosed herein include devices, systems, and methods for autocompleting data fields based on interaction with a person. In various implementations, a device includes a display, a non-transitory memory and one or more processors coupled with the display and the non-transitory memory. In various implementations, a method includes displaying, on the display, a graphical user interface (GUI) that includes a set of data fields including a first data field that accepts a first type of data. In some implementations, the method includes detecting that a user of the device is interacting with a person. In some implementations, the method includes obtaining the first type of data associated with the person. In some implementations, the method includes displaying an affordance that, when activated, triggers the device to populate the first data field with the first type of data associated with the person.

12 Claims, 8 Drawing Sheets

(56) References Cited

U.S. PATENT DOCUMENTS

2017/0357627 A1* 12/2017 Peterson ................. G06F 7/023
2018/0181866 A1   6/2018 Dalle et al.
2018/0211258 A1   7/2018 Buis et al.

* cited by examiner

AUTOCOMPLETING DATA FIELDS BASED ON INTERACTION WITH A PERSON

CROSS-REFERENCE TO RELATED APPLICATION

This application claims the benefit of U.S. Provisional Patent App. No. 63/247,942, filed on Sep. 24, 2021, which is incorporated by reference in its entirety.

TECHNICAL FIELD

The present disclosure generally relates to autocompleting data fields based on interaction with a person.

BACKGROUND

Some devices are capable of generating and presenting environments that include many objects. These objects may mimic real world objects. These environments may be presented on mobile communication devices.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for autocompleting data fields based on interaction with a person in a privacy preserving manner. In various implementations, a device includes a display, a non-transitory memory and one or more processors coupled with the display and the non-transitory memory. In various implementations, a method includes displaying, on the display, a graphical user interface (GUI) that includes a set of data fields including a first data field that accepts a first type of data. In some implementations, the method includes detecting that a user of the device is interacting with a person. In some implementations, the method includes obtaining the first type of data associated with the person. In some implementations, the method includes displaying an affordance that, when activated, triggers the device to populate the first data field with the first type of data associated with the person.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

Some devices provide an autofill option that allows a user of the device to automatically populate a set of data fields with data associated with a stored data set. For example, if the user is viewing a web page that has an address data field for an address, the user can invoke the autofill option to automatically populate the address data field with address information stored in association with the user's name. However, the autofill option only allows the user to automatically populate the data fields with information that is already stored on the device. If the user is interacting with a person whose information is not stored in the device, previously available autofill options will not allow the user to automatically populate data fields with information related to the person because such information is not accessible to the autofill option. As such, the user has to ask the person for his/her information and manually enter the information in the data fields.

The present disclosure provides methods, devices and/or systems for automatically populating data fields based on a person that the user is interacting with in a privacy preserving manner. While the user is communicating with the person, the autofill options are expanded to include a data set that corresponds to the person. For example, while the user is communicating with a colleague, the autofill options provide the user an option to populate data fields with information associated with the colleague that is publicly available or that may be obtained with the colleague's informed consent. The data set corresponding to the colleague can be removed from the autofill datastore after the user stops communicating with the colleague. The new data set can be obtained from a contact entry in a contacts application. For example, if the device detects that the user is communicating with a particular contact, the device provides an option to autofill data fields in a web page with information that is stored in that particular contact's contact entry (e.g., full name, address, phone number, email, etc.).

The device can obtain the data set for the person from a remote database (e.g., from a public account or an account having a trusted relationship with the user on a social networking platform). For example, the device may recognize the identity of a person that the user is talking to from an image, and search a social network platform for more information regarding the person (e.g., full name, address, phone number, etc.) that was provided for public access or provided to the user with informed consent. While the user is talking to that person, the device provides an option to populate data fields with that person's information. If the user often interacts with unknown individuals during the day (e.g., at a walk-in clinic, a customer service desk, coffee shop, etc.), the user advantageously need not ask each person for their information.

Figure 1A:
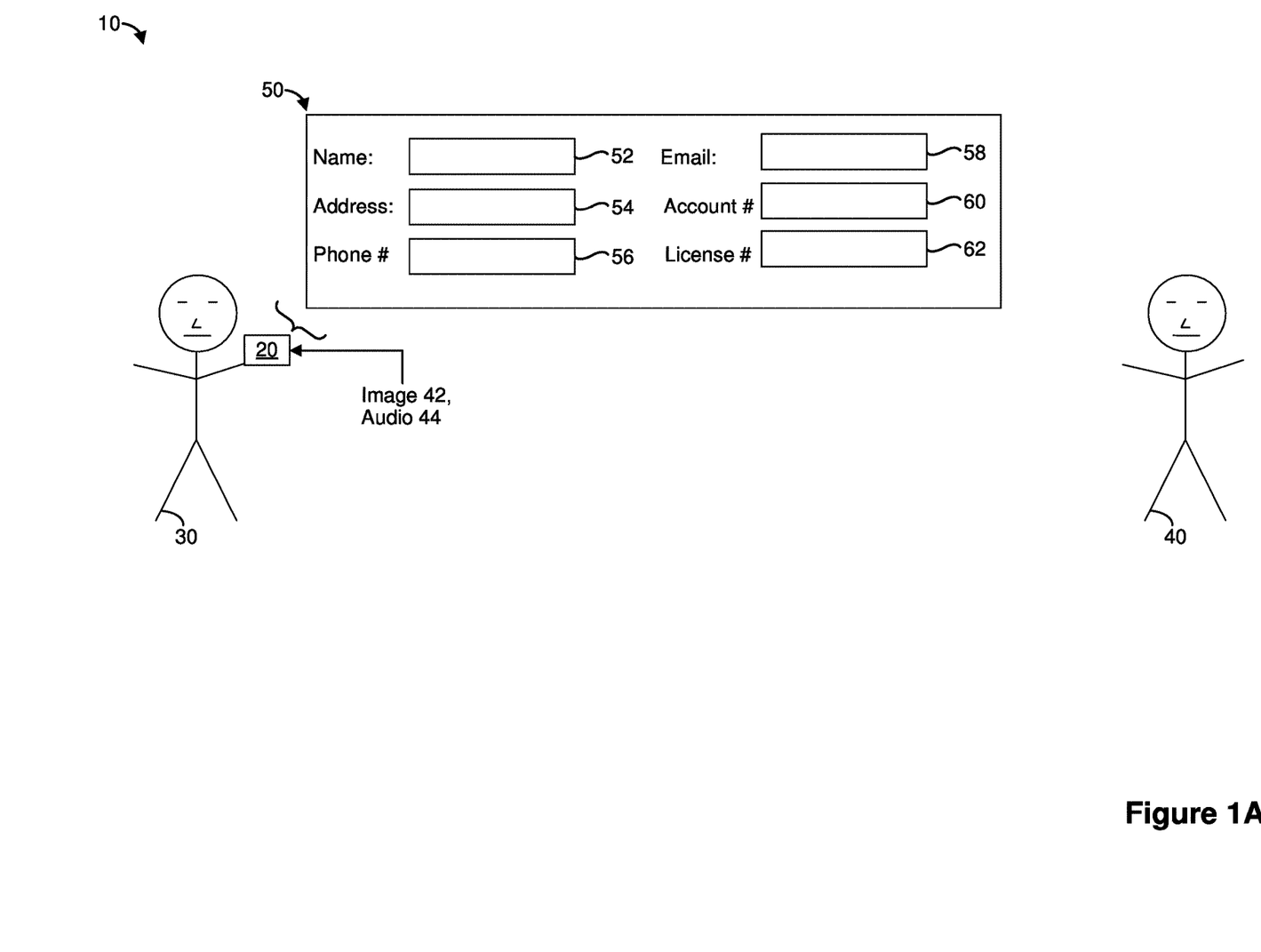
FIGS. 1A-1E are diagrams of an example operating environment in accordance with some implementations.

FIG. 1A is a diagram of an example operating environment 10 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 10 includes an electronic device 20, a user 30 of the electronic device 20 and a person 40.

In some implementations, the electronic device 20 includes a handheld computing device that can be held by the user 30. For example, in some implementations, the electronic device 20 includes a smartphone, a tablet, a media player, a laptop, or the like. In some implementations, the electronic device 20 includes a wearable computing device that can be worn by the user 30. For example, in some implementations, the electronic device 20 includes a head-mountable device (HMD) that can be worn around a head of the user 30, an electronic watch or a pair of headphones.

In various implementations, the electronic device 20 displays a graphical user interface (GUI) 50 that includes various data fields that can be populated by the user 30. In the example of FIG. 1A, the GUI 50 includes a name data field 52 for entering a name of the person 40, an address data field 54 for entering an address of the person 40, a phone data field 56 for entering a phone number of the person 40, an email address data field 58 for entering an email address of the person 40, an account number data field 60 for entering an account number of the person 40 and a license number data field 62 for entering a license number of the person 40.

While the user 30 can manually enter information pertaining to the person 40 into the data fields 52, 54, . . . , and 62, in various implementations, the electronic device 20 automatically populates the data fields 52, 54, . . . , and 62 with information pertaining to the person 40 after detecting and identifying the person 40. In some implementations, the electronic device 20 includes an image sensor (e.g., camera) that captures an image 42 of the operating environment 10. In such implementations, the electronic device 20 may detect, with notice or informed consent, the presence of the person 40 in the operating environment 10 and determines an identity of the person 40 by analyzing the image 42. In some implementations, the electronic device 20 includes an audio sensor (e.g., a microphone) that receives audible signal data 44 ("audio 44", hereinafter for the sake of brevity). In such implementations, the electronic device 20 may detect, with notice or informed consent, the presence of the person 40 in the operating environment 10 and determines an identity of the person 40 by analyzing the audio 44. After determining the identity of the person 40, the electronic device 20 retrieves the relevant information pertaining to the person 40 and displays the relevant information in the data fields 52, 54, . . . , and 62.

Figure 1B:
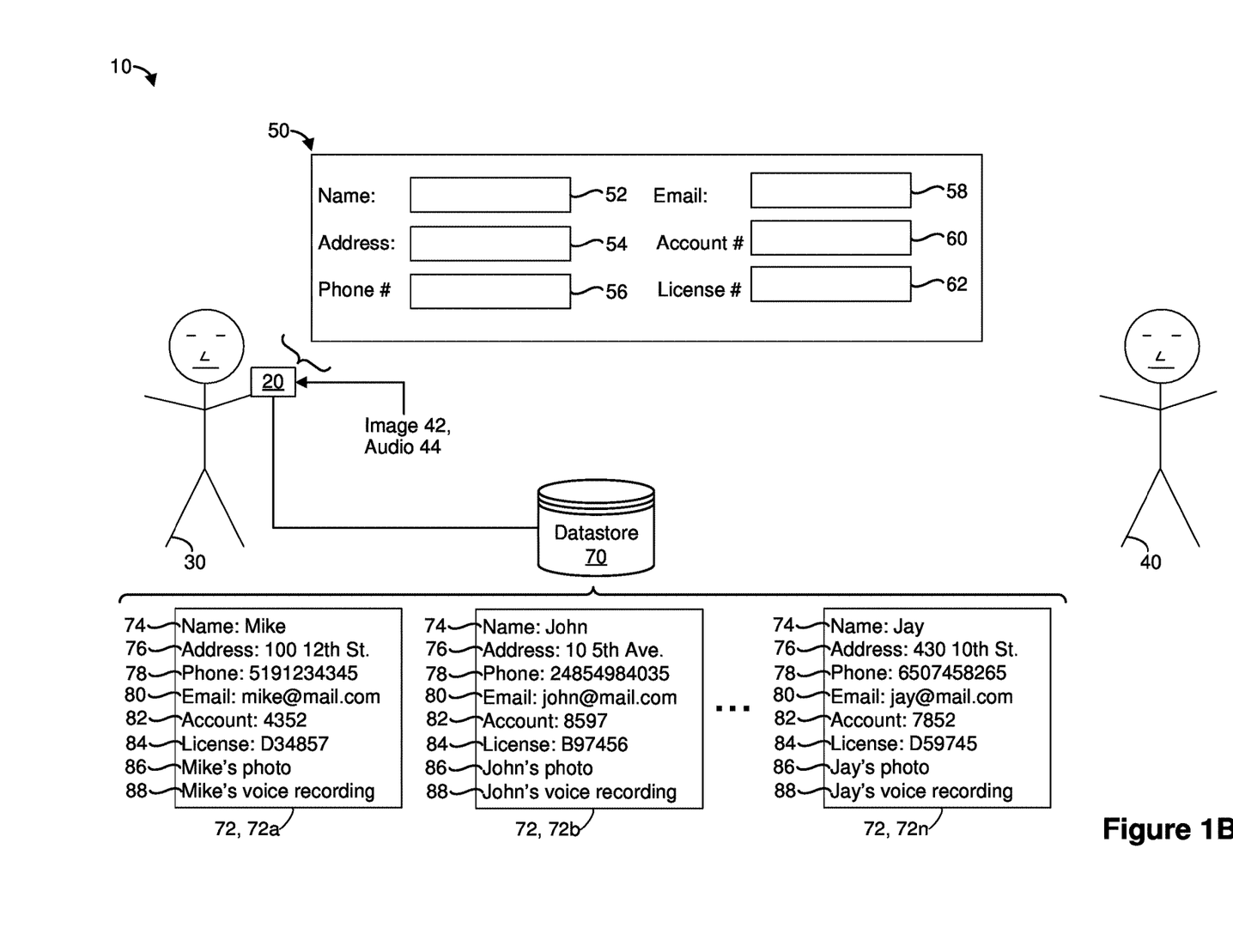

Referring to FIG. 1B, in some implementations, the electronic device 20 accesses a datastore 70 to determine an identity of the person 40. In some implementations, the datastore 70 stores various records 72 corresponding to different people that have made those records 72 publicly available, have authorized the user 30 to access the records 72, or have a trusted relationship with the user 30. In some implementations, the records 72 may have been entered by the user 30 using information already known or available to the user 30. For example, as shown in FIG. 1B, in some implementations, the datastore 70 stores a first record 72a for a person named Mike, a second record 72b for a person named John, . . . , and an nth record 72n for a person named Jay. In some implementations, each record 72 stores a name 74, an address 76, a phone number 78, an email address 80, an account number 82, a license number 84, a photo 86 and/or a voice recording 88. More generally, in various implementations, each record 72 stores information (e.g., personal information) for a person corresponding to the record 72. For example, the first record 72a stores Mike's address, phone number, email address, etc. Similarly, the second record 72b stores John's address, phone number, email address, etc. People associated with the records 72 may limit the degree to which others may access or otherwise obtain their information. For instance, settings or other preferences may be adjusted such that users can decide whether their personal information can be accessed by various entities.

Figure 1C:
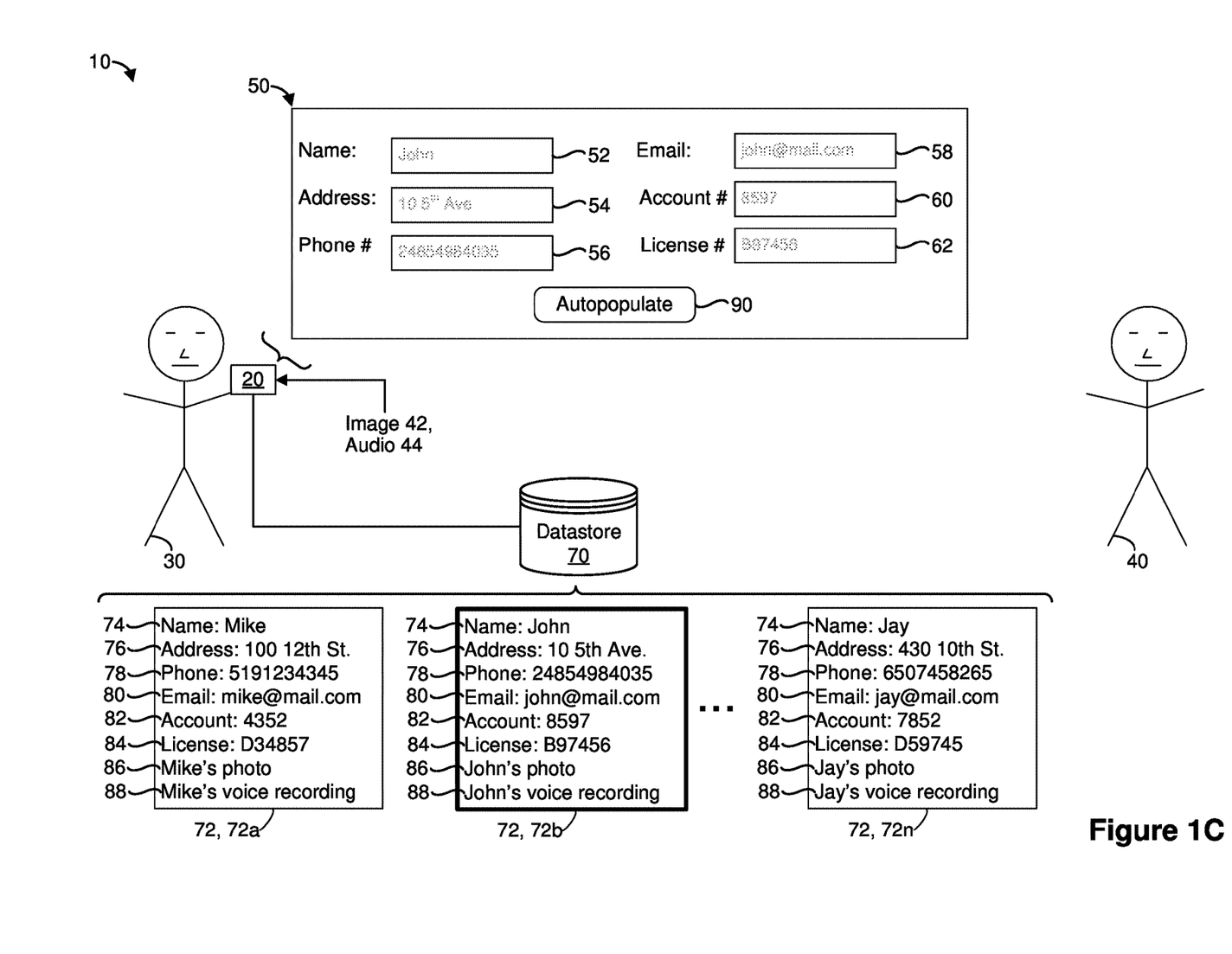

Referring to FIG. 1C, in some implementations, the electronic device 20 determines an identity of the person 40 by comparing, with notice or informed consent, the image 42 of the person 40 with the photos 86 stored in association with the records 72. In some implementations, the electronic device 20 determines similarity scores that indicate how similar the image 42 is to the photos 86 stored in the records 72. The electronic device 20 determines that the person 40 matches a particular one of the records 72 when the similarity score for that particular record 72 is greater than a threshold (e.g., 0.90). In other words, in some implementations, the electronic device 20 determines that the person 40 matches a particular record 72 when the image 42 of the person 40 is within a similarity threshold of the photo 86 stored in that particular record 72. In the example of FIG. 1C, the electronic device 20 determines that the person 40 is John, for example, because the image 42 is within a similarity threshold of the photo 86 stored in association with the second record 72b for John.

In some implementations, the electronic device 20 determines an identity of the person 40 by comparing, with notice or informed consent, the audio 44 of the person 40 with the voice recordings 88 stored in association with the records 72. In some implementations, the electronic device 20 determines similarity scores that indicate how similar the audio 44 is to the voice recordings 88 stored in the records 72. The electronic device 20 determines that the person 40 matches a particular one of the records 72 when the similarity score for that particular record 72 is greater than a threshold (e.g., 0.90). In other words, in some implementations, the electronic device 20 determines that the person 40 matches a particular record 72 when the audio 44 of the person 40 is within a similarity threshold of the voice recording 88 stored in that particular record 72. In the example of FIG. 1C, the electronic device 20 determines that the person 40 is John, for example, because the audio 44 is within a similarity threshold of the voice recording 88 stored in association with the second record 72*b* for John.

In some implementations, after identifying the person 40 and accessing information associated with the person 40, the electronic device 20 provides the user 30 an option to automatically populate the data fields 52, 54, . . . , and 62 with the information pertaining to the person 40 for which they have access. For example, as shown in FIG. 1C, the GUI 50 displays an autopopulate affordance 90 that, when activated by the user 30, triggers the electronic device 20 to automatically populate the data fields 52, 54, . . . , and 62 with information from the second record 72*b*. In some implementations, the electronic device 20 displays an indication that selecting the autopopulate affordance 90 triggers the electronic device 20 to fill-in the data fields 52, 54, . . . , and 62 with information corresponding to the person 40. For example, as shown in FIG. 1C, the electronic device 20 overlays the information from the second record 72*b* onto the data fields 52, 54, . . . , and 62 in gray and using a smaller font (e.g., a font size of 10).

Figure 1D:
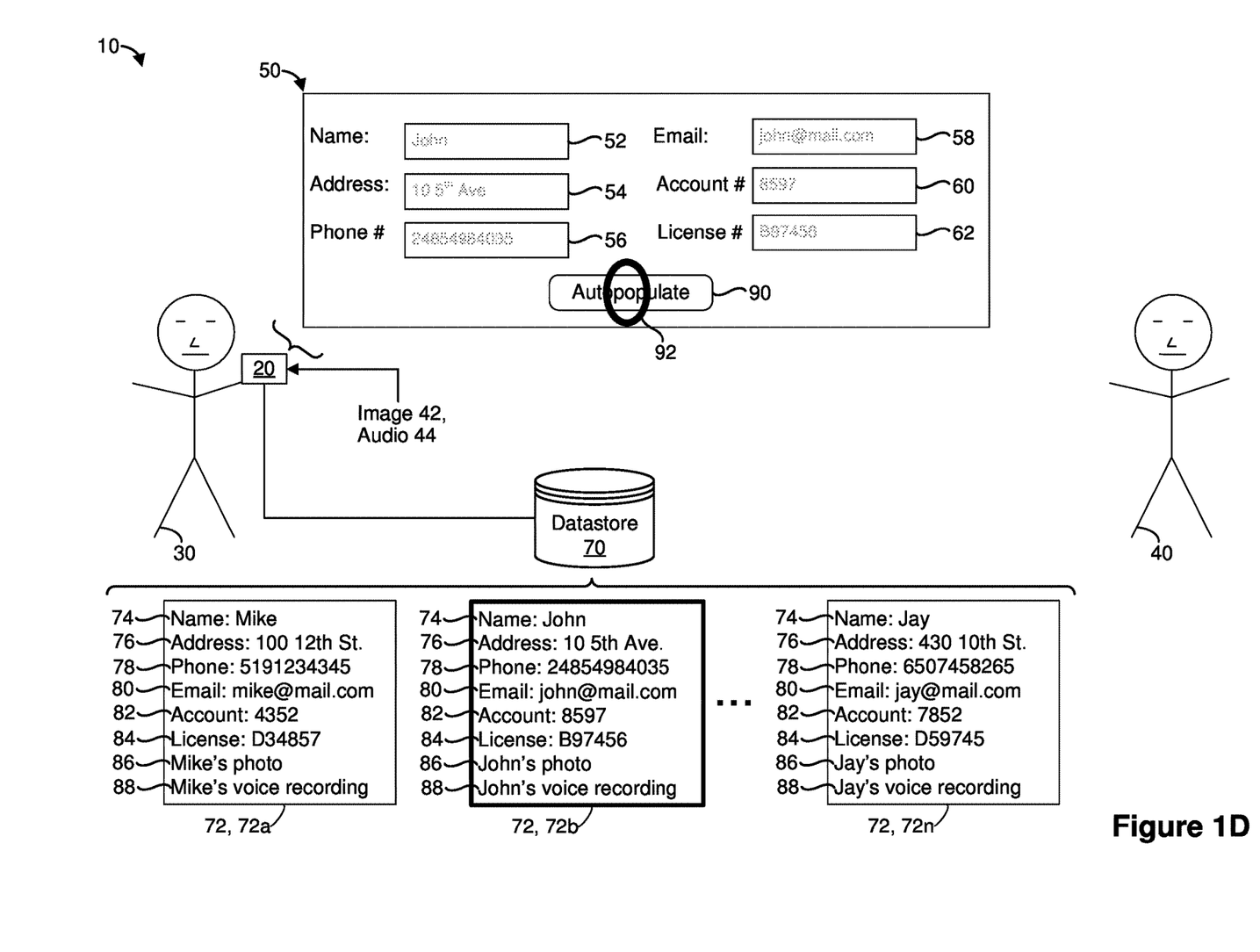
Figure 1E:
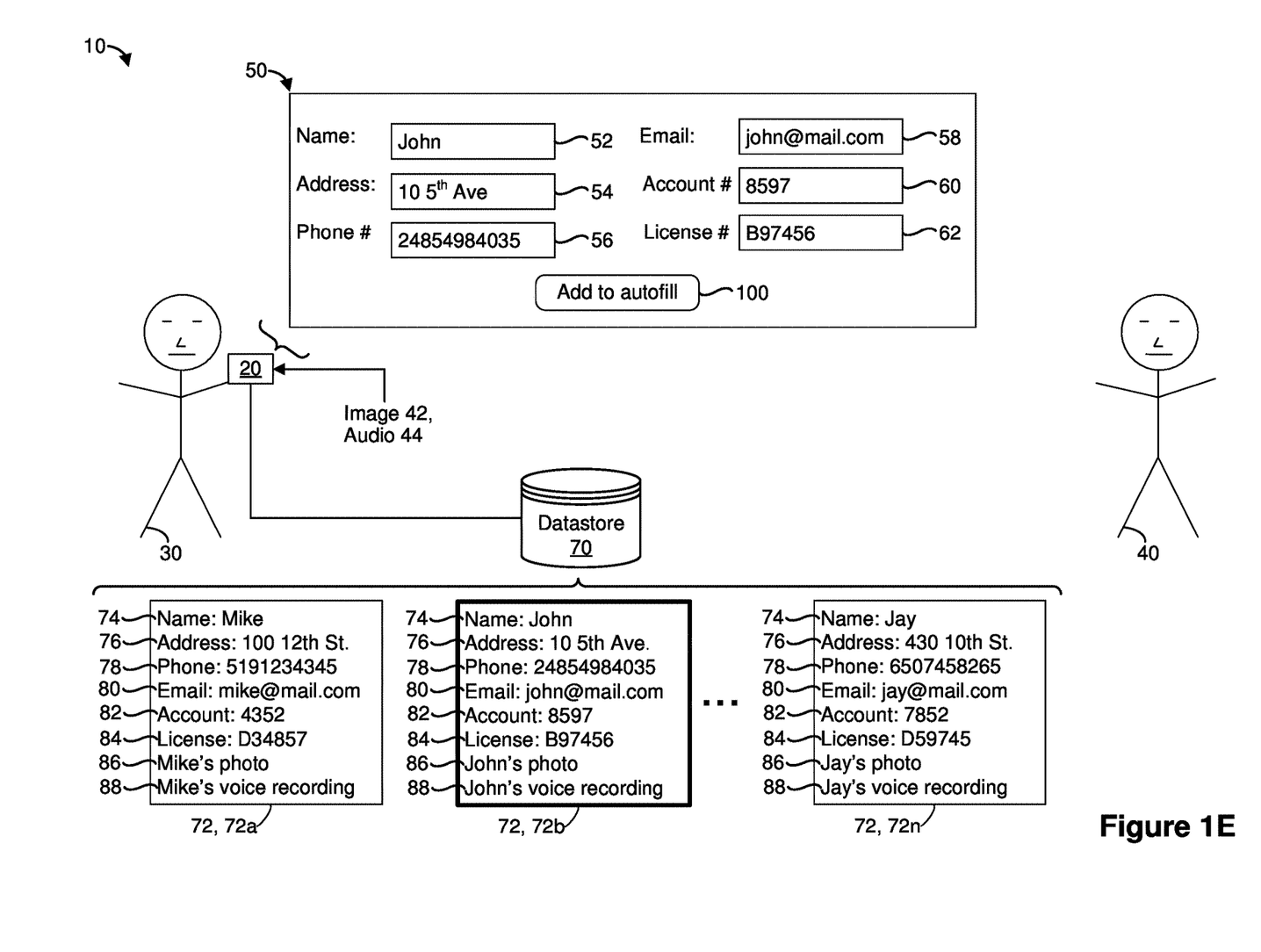

Referring to FIG. 1D, the electronic device 20 detects a user input 92 at a location corresponding to the autopopulate affordance 90. The user input 92 corresponds to a request to populate the data fields 52, 54, . . . , and 62 with information corresponding to the person 40. As such, as shown in FIG. 1E, in response to detecting the user input 92, the electronic device 20 populates the data fields 52, 54, . . . , and 62 with the information from the second record 72*b*. As shown in FIG. 1E, the text in the data fields 52, 54, . . . , and 62 is shown in black and using a regular font (e.g., a font size of 12).

In some implementations, the electronic device 20 provides the user 30 an option to add, with notice or informed consent, the information pertaining to the user 40 to an autofill datastore for an extended period of time. For example, as shown in FIG. 1E, the electronic device 20 displays an add affordance 100. If the user 30 selects the add affordance 100, the electronic device 20 stores the information provided by the second record 72*b* in an autofill datastore. Once the information is stored in the autofill datastore, the user 30 can trigger the electronic device 20 to automatically populate data fields with the information even when the person 40 is not in the operating environment 10. By contrast, if the information pertaining to the person 40 is not stored in the autofill datastore, the user 30 may only be able to trigger the electronic device 20 to automatically populate data fields with the information when the person 40 is in the operating environment 10. However, it should be appreciated that to provide the person 40 with knowledge of and control over the use of their personal information, the person 40 may be provided with the option to limit the ability of the user 30 to add their information to the autofill datastore.

In some implementations, the datastore 70 resides at the electronic device 20. For example, in some implementations, the datastore 70 is associated with a contacts application that is installed on the electronic device 20. In such implementations, the records 72 correspond to contact entries that are stored in association with the contacts application. Alternatively, in some implementations, the datastore 70 resides at a remote device (e.g., a server that is separate from the electronic device 20). In some implementations, the datastore 70 is associated with a social network platform. In various implementations, the electronic device 20 queries the datastore 70 with the image 42 and/or the audio 44, and the electronic device 20 may receive the information stored in a particular one of the records 72 that matches the image 42 and/or the audio 44 if the corresponding user has provided informed consent to do so.

In various implementations, the electronic device 20 presents (e.g., displays) an extended reality (XR) environment on a display of the electronic device 20. In some implementations, the GUI 50 is displayed within the XR environment. In some implementations, the XR environment is a pass-through representation of a physical environment surrounding the electronic device 20. For example, the XR environment is a pass-through of the operating environment 10. In some implementations, the pass-through is an optical pass-through in which visible light from the physical environment enters eyes of the user 30. In some implementations, the pass-through is a video pass-through in which the user 30 views a video of the physical environment.

In some implementations, the electronic device 20 includes or is attached to a head-mountable device (HMD) worn by the user 30. The HMD presents (e.g., displays) the XR environment according to various implementations. In some implementations, the HMD includes an integrated display (e.g., a built-in display) that displays the XR environment. In some implementations, the HMD includes a head-mountable enclosure. In various implementations, the head-mountable enclosure includes an attachment region to which another device with a display can be attached. For example, in some implementations, the electronic device 20 can be attached to the head-mountable enclosure. In various implementations, the head-mountable enclosure is shaped to form a receptacle for receiving another device that includes a display (e.g., the electronic device 20). For example, in some implementations, the electronic device 20 slides/snaps into or otherwise attaches to the head-mountable enclosure. In some implementations, the display of the device attached to the head-mountable enclosure presents (e.g., displays) the XR environment. In some implementations, the HMD includes a scene-facing camera that captures the image 42 or the person 40. In various implementations, examples of the electronic device 20 include smartphones, tablets, media players, laptops, etc.

Figure 2:
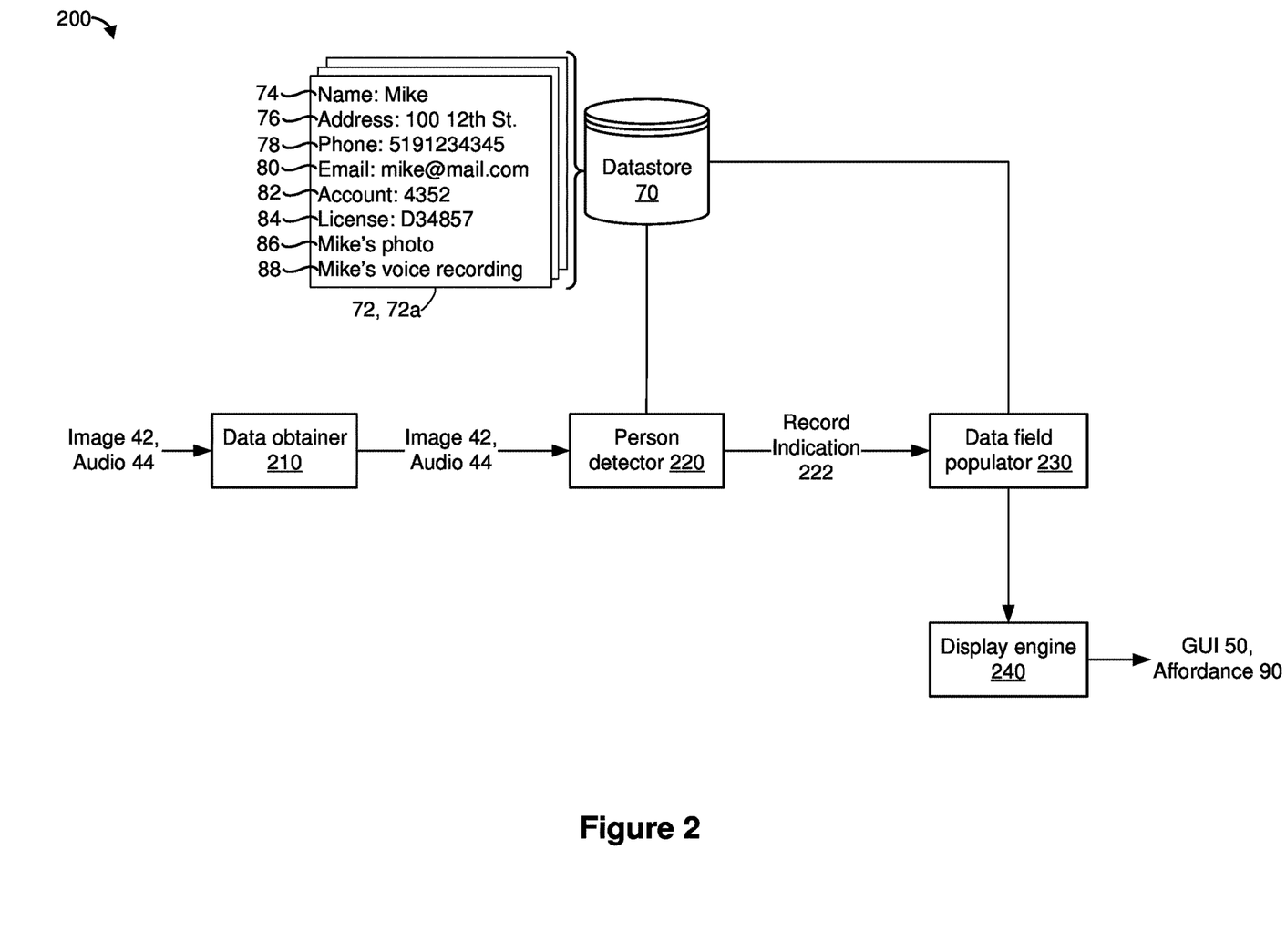
FIG. 2 is a block diagram of a system in accordance with some implementations.

FIG. 2 is a block diagram of a system 200 in accordance with some implementations. In some implementations, the system 200 resides at (e.g., is implemented by) the electronic device 20 shown in FIGS. 1A-1E. In some implementations, the electronic device 20 (shown in FIGS. 1A-1E) includes the system 200. In various implementations, the system 200 includes the datastore 70, a data obtainer 210, a person detector 220, a data field populator 230 and a display engine 240.

In various implementations, the data obtainer 210 obtains the image 42 and/or the audio 44. In some implementations, the data obtainer 210 receives the image 42 from an image sensor (e.g., a camera, for example, a scene-facing camera). In some implementations, the data obtainer 210 receives the audio 44 from an audio sensor (e.g., a microphone). The data obtainer 210 provides the image 42 and/or the audio 44 to the person detector 220.

In various implementations, the person detector 220 analyzes the image 42 and/or the audio 44 to determine whether or not the user 30 of the electronic device 20 is interacting with the person 40. In some implementations, the person detector 220 determines that the user 30 of the electronic device 20 is interacting with the person 40 in response to determining that the person 40 is facing the user 30, and the user 30 or the person 40 are talking. In some implementations, the person detector 220 determines that the user 30 of the electronic device 20 is interacting with the person 40 based on a body pose of the person 40. For example, if the body pose of the person 40 matches body poses associated with non-verbal communication, the person detector 220 determines that the user 30 of the electronic device 20 is interacting with the person 40.

In various implementations, the person detector 220 determines an identity of the person 40 by comparing the image 42 with photos 86 stored in the datastore 70 and/or by comparing the audio 44 with voice recordings 88 stored in the datastore 70. As mentioned above, the datastore 70 may include the records 72 associated with people that have made their records 72 public, have authorized the user 30 to access their records 72, or have a trusted relationship with the user 30. The datastore 70 may also include records 72 entered by the user 30 using information already known or available to the user 30 (e.g., contact information entered by the user 30, photos taken by the user 30, etc.). For example, as explained in relation to FIG. 1C, in some implementations, if the image 42 matches a photo 86 stored in the second record 72b, the person detector 220 determines that the second record 72b corresponds to the person 40. As explained in relation to FIG. 1C, in some implementations, if the audio 44 matches a voice recording 88 stored in the second record 72b, the person detector 220 determines that the second record 72b corresponds to the person 40. The person detector 220 provides a record indication 222 to the data field populator 230. In some implementations, the record indication 222 includes an identifier (ID) of the record 72 that corresponds to the person 40. As an example, the record indication 222 may specify that the second record 72b corresponds to the person 40 by including a record ID of the second record 72b.

In various implementations, the data field populator 230 causes the display engine 240 to display the autopopulate affordance 90 within the GUI 50 in response to receiving the record indication 222. In some implementations, the data obtainer 210 obtains an indication that the autopopulate affordance 90 has been activated. In response to an activation of the autopopulate affordance 90, the data field populator 230 populates the data fields in the GUI 50 with information stored in the record 72 corresponding to the person 40. For example, if the second record 72b corresponds to the person, the data field populator 230 automatically populates the data fields in the GUI 50 with information stored in the second record 72b.

Figure 3:
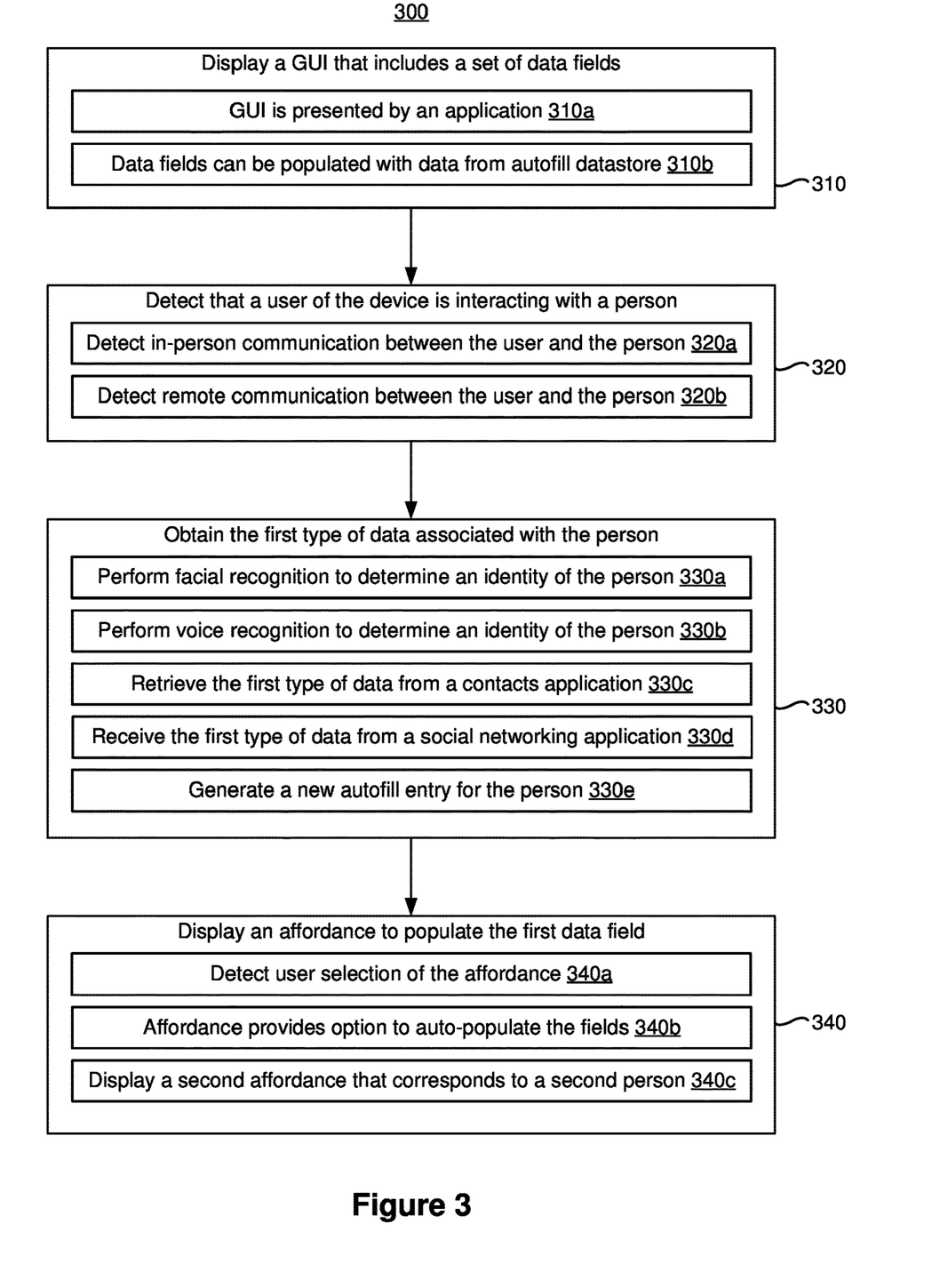
FIG. 3 is a flowchart representation of a method of autocompleting data fields based on interaction with a person in accordance with some implementations.

FIG. 3 is a flowchart representation of a method 300 of autocompleting data fields based on an interaction of a user with a person. In various implementations, the method 300 is performed by a device including a display, one or more processors and a non-transitory memory (e.g., the electronic device 20 shown in FIGS. 1A-1E, and/or the system 200 shown in FIG. 2). In some implementations, the method 300 is performed by processing logic, including hardware, firmware, software, or a combination thereof. In some implementations, the method 300 is performed by a processor executing code stored in a non-transitory computer-readable medium (e.g., a memory).

As represented by block 310, in various implementations, the method 300 includes displaying, on the display, a graphical user interface (GUI) that includes a set of data fields including a first data field that accepts a first type of data. For example, as shown in FIGS. 1A-1E, the electronic device 20 displays the GUI 50 with the data fields 52, 54, . . . , and 62. As explained herein, the name data field 52 accepts a string of alphanumeric characters that corresponds to name of the person 40, and the phone number data field 56 accepts a string of numeric characters that corresponds to a phone number of the person 40.

As represented by block 310a, in some implementations, the GUI is generated and presented by an application. For example, in some implementations, the GUI includes a web page that is presented by a browser application. In some implementations, the GUI includes a message composition window that is generated and presented by an email application or a messaging application.

As represented by block 310b, in some implementations, the set of data fields can be populated with data from an autofill datastore. For example, as described herein, in some implementations, the electronic device 20 provides the user 30 an option to populate the data fields with information from a data set that is stored in an autofill datastore. In some implementations, the user adds information to an autofill datastore by manually completing a set of data fields and then requesting that the information entered manually be stored in the autofill datastore.

As represented by block 320, in some implementations, the method 300 includes detecting that a user of the device is interacting with a person. For example, as described in relation to FIGS. 1A-1E, the electronic device 20 detects that the user 30 is interacting with the person 40. As represented by block 320a, in some implementations, detecting that the user is interacting with the person includes obtaining, via an environmental sensor, environmental data indicating that the person is located in a physical environment of the device and that the user is in communication with the person. In some implementations, the environmental sensor includes a microphone, and the method 300 includes receiving, via the microphone, audible signal data indicating that the user and the person are speaking with each other. For example, as shown in FIGS. 1A-1E, the electronic device 20 obtains the audio 44 and the electronic device 20 determines that the user 30 and the person 40 are interacting by analyzing the audio 44. In some implementations, the environmental sensor includes a camera, and the method 300 includes capturing, via the camera, image data indicating that the user is communicating with the person. For example, as shown in FIGS. 1A-1E, the electronic device 20 obtains the image 42 and the electronic device 20 determines that the user 30 and the person 40 are interacting by analyzing the image 42. In some implementations, the environmental data may be captured with notice to, or consent from, the person with which the user is interacting. More generally, in various implementations, the method 300 includes detecting that the user and the person are engaged in an in-person interaction.

As represented by block 320b, in some implementations, detecting that the user is interacting with the person includes obtaining electronic data indicating that the user is communicating with the person via the device. For example, in some implementations, the method 300 includes obtaining electronic data in the form of audible signal data from a phone application installed on the electronic device that indicates that the user 30 and the person 40 are engaged in a phone conversation. As another example, in some implementations, the method 300 includes obtaining electronic data in the form of messaging data from a messaging application installed on the electronic device that indicates that the user 30 and the person 40 are engaged in a messaging session (e.g., a real-time messaging session or an intermittent messaging session such as an email thread). More generally, in various implementations, the method 300 includes detecting that the user and the person are engaged in a remote interaction.

As represented by block 330, in some implementations, the method 300 includes obtaining the first type of data associated with the person. In some implementations, the method 300 includes determining an identity of the person based on an image of the person and/or based on a voice of the person. For example, as shown in FIGS. 1C and 1D, the electronic device 20 obtains information stored in the second record 72b after determining that the second record 72b corresponds to the person 40. As mentioned above, the person may have made their data public, may have authorized the user to access their data, or may have a trusted relationship with the user. In some implementations, the data associated with the person may have been already known or available to the user.

As represented by block 330a, in some implementations, obtaining the first type of data associated with the person includes obtaining, via an image sensor, an image of the person, performing facial recognition on the image in order to identify the person, and querying a datastore for the first type of data associated with the person in response to identifying the person. For example, the electronic device 20 (e.g., the person detector 220 shown in FIG. 2) performs facial recognition on the image 42 and queries the datastore 70 for a name, an address, a phone number, an email address, etc. of the person 40. The person may be notified or may have given consent to have their image captured and used to query the datastore.

As represented by block 330b, in some implementations, obtaining the first type of data associated with the person includes obtaining, via a microphone, audible signal data corresponding to the person, performing voice recognition on the audible signal data in order to identify the person, and querying a datastore for the first type of data associated with the person in response to identifying the person. For example, the electronic device 20 (e.g., the person detector 220 shown in FIG. 2) performs voice recognition on the audio 44 and queries the datastore 70 for a name, an address, a phone number, an email address, etc. of the person 40. The person may be notified or may have given consent to have their image captured and used to query the datastore.

As represented by block 330c, in some implementations, obtaining the first type of data associated with the person includes identifying, from a plurality of contact entries stored in association with a contacts application, a particular contact entry corresponding to the person that the user is interacting with, and retrieving the first type of data from the particular contact entry corresponding to the person that the user is interacting with. For example, in some implementations, the records 72 shown in FIGS. 1B-2 are contact entries, and the electronic device 20 (e.g., the person detector 220 shown in FIG. 2) determines that the person 40 matches a contact entry represented by the second record 72b, and the electronic device 20 retrieves the information stored in the second record 72b.

As represented by block 330d, in some implementations, obtaining the first type of data associated with the person includes querying a social networking platform for the first type of data associated with the person, and receiving, from the social networking platform, the first type of data associated with the person. For example, in some implementations, the records 72 shown in FIGS. 1B-2 are social networking profiles for different people, and the electronic device 20 (e.g., the person detector 220 shown in FIG. 2) determines that the person 40 matches a social network profile represented by the second record 72b, and the electronic device 20 retrieves the information stored in the second record 72b. The first type of data may be obtained from a public account or an account having a trusted relationship with the user on the social networking platform.

As represented by block 330e, in some implementations, the method 300 includes generating, in an autofill datastore, a new autofill entry that corresponds to the person that the user is interacting with, and storing the first type of data associated with the person in the new autofill entry that corresponds to the person. In some implementations, the method 300 includes expanding the autofill options to include information corresponding to the person that the user is interacting with while the user is interacting with the person. As such, if the user has to complete multiple web forms for the person, the information corresponding to the person will be available for autocompletion for each of the forms. In some implementations, the method 300 includes determining that an interaction between the user and the person has ceased, and in response to determining that the interaction between the user and the person has ceased, automatically purging the new autofill entry that corresponds to the person. For example, the electronic device deletes the autofill entry when the user and the person stop interacting. Automatically purging the autofill entry when the interaction has ended prevents the autofill datastore from unnecessarily increasing in size thereby conserving memory.

As represented by block 340, in some implementations, the method 300 includes displaying an affordance that, when activated, triggers the device to populate the first data field with the first type of data associated with the person. In some implementations, the activating the affordance reduces a need for a sequence of user inputs that corresponds to manually entering the first type of data in the first data field. For example, as shown in FIG. 1C, the GUI 50 includes the autopopulate affordance 90 that, when activated by the user 30, triggers the electronic device 20 to populate the data fields 52, 54, . . . , and 62 with information stored in the second record 72b that corresponds to the person 40.

As represented by block 340a, in some implementations, the method 300 includes detecting a user input directed to the affordance, and populating the first data field with the first type of data associated with the person. For example, as shown in FIG. 1D, the electronic device 20 detects the user input 92 directed to the autopopulate affordance 90, and in response to detecting the user input 92, the electronic device 20 populates the data fields 52, 54, . . . , and 62 with information stored in the second record 72b that corresponds to the person 40.

As represented by block 340b, in some implementations, the affordance indicates that the user has an option to automatically populate the set of data fields with information that corresponds to the person. For example, as shown in FIG. 1C, the electronic device 20 overlays the information from the second record 72b onto the data fields 52, 54, . . . , and 62 when the autopopulate affordance 90 is displayed and can be activated by the user 30.

As represented by block 340c, in some implementations, the method 300 includes displaying a second affordance that, when activated, triggers the device to populate the set of data fields with information associated with a second person. In some implementations, the GUI 50 provides the user 30 an option to populate the data fields 52, 54, . . . , and 62 with information that is already stored in an autofill datastore. For example, the user 30 can populate the data fields 52, 54, . . . , and 62 with information that pertains to the user 30 instead of populating the data field 52, 54, . . . , and 62 with information that pertains to the person 40.

Figure 4:
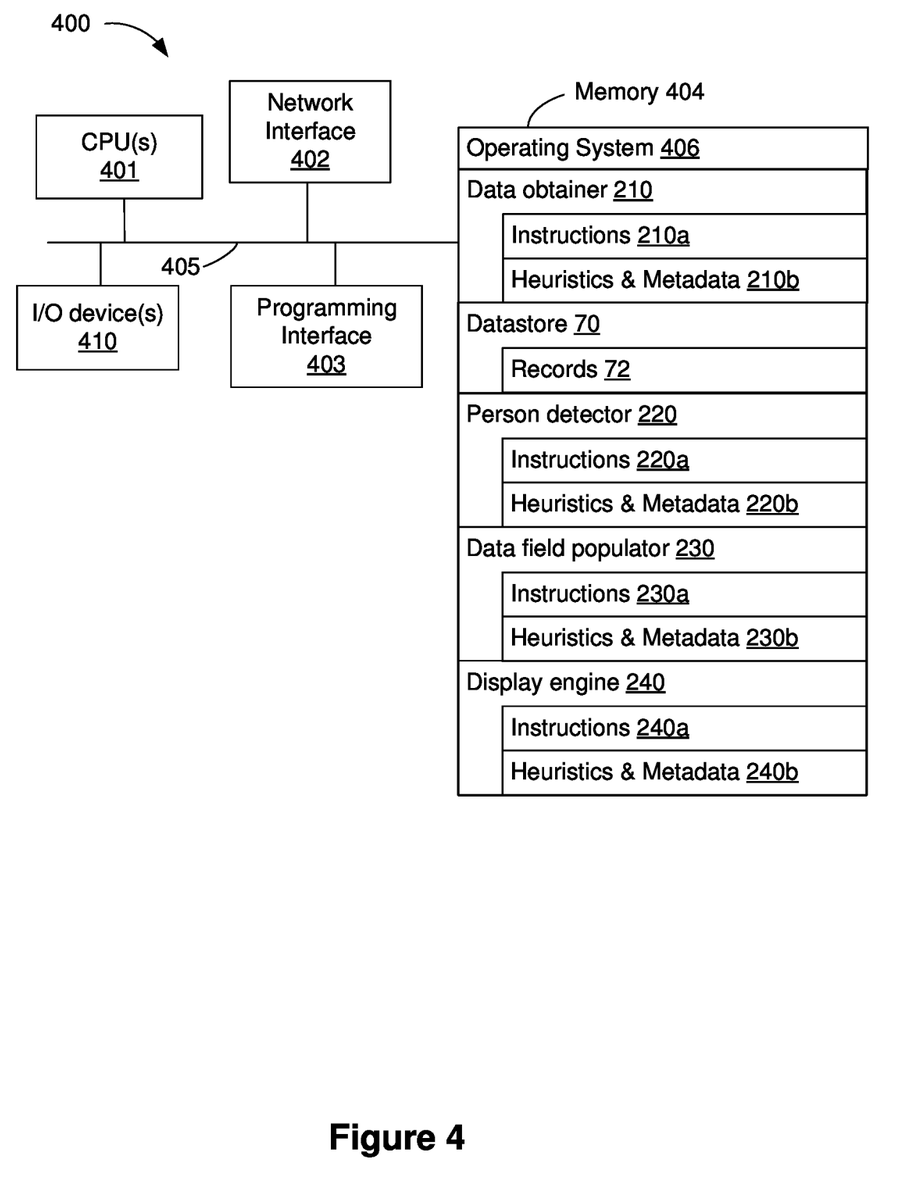
FIG. 4 is a block diagram of a device that autocompletes data fields based on interaction with a person in accordance with some implementations.

FIG. 4 is a block diagram of a device 400 that autocompletes data fields based on an interaction between a user of the device 400 with a person in accordance with some implementations. In some implementations, the device 400 implements the electronic device 20 shown in FIGS. 1A-1E, and/or the system 200 shown in FIG. 2. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations, the device 400 includes one or more processing units (CPUs) 401, a network interface 402, a programming interface 403, a memory 404, one or more input/output (I/O) devices 410, and one or more communication buses 405 for interconnecting these and various other components.

In some implementations, the network interface 402 is provided to, among other uses, establish and maintain a metadata tunnel between a cloud hosted network management system and at least one private network including one or more compliant devices. In some implementations, the one or more communication buses 405 include circuitry that interconnects and controls communications between system components. The memory 404 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 404 optionally includes one or more storage devices remotely located from the one or more CPUs 401. The memory 404 comprises a non-transitory computer readable storage medium.

In some implementations, the memory 404 or the non-transitory computer readable storage medium of the memory 404 stores the following programs, modules and data structures, or a subset thereof including an optional operating system 406, the datastore 70, the data obtainer 210, the person detector 220, the data field populator 230 and the display engine 240. In various implementations, the device 400 performs the method 300 shown in FIG. 3.

In various implementations, the data obtainer 210 includes instructions 210a, and heuristics and metadata 210b for obtaining image data (e.g., the image 42 shown in FIGS. 1A-2), audible signal data (e.g., the audio 44 shown in FIGS. 1A-2) and/or user inputs (e.g., the user input 92 shown in FIG. 1D). In various implementations, the person detector 220 includes instructions 230a, and heuristics and metadata 230b for detecting that the user of the device 400 is interacting with a person and for determining an identity of the person that the user of the device 400 is interacting with. In various implementations, the display engine 240 includes instructions 240a, and heuristics and metadata 240b for displaying the GUI 50 and the autopopulate affordance 90 shown in FIGS. 1C and 1D. In various implementations, the data field populator 230 includes instructions 230a, and heuristics and metadata 230b for automatically populating the data fields included in the GUI 50 in response to the data obtainer 210 obtaining a user input that activates the autopopulate affordance 90.

In various implementations, the one or more I/O devices 410 include an image sensor (e.g., a camera) for capturing images (e.g., the image 42 shown in FIGS. 1A-2). In some implementations, the one or more I/O devices 410 include an audio sensor (e.g., a microphone) to capture the audible signal data (e.g., the audio 44 shown in FIGS. 1A-2). In some implementations, the one or more I/O devices 410 include a display for displaying an XR environment with a GUI (e.g., the GUI 50 shown in FIGS. 1A-1E). In some implementations, the one or more I/O devices 410 include a speaker for outputting an audible signal.

In various implementations, the one or more I/O devices 410 include a video pass-through display which displays at least a portion of a physical environment surrounding the device 400 as an image captured by a scene camera. In various implementations, the one or more I/O devices 410 include an optical see-through display which is at least partially transparent and passes light emitted by or reflected off the physical environment.

Various processes defined herein consider the option of obtaining and utilizing a user's personal information. For example, such personal information may be utilized in order to provide an improved privacy screen on an electronic device. However, to the extent such personal information is collected, such information should be obtained with the user's informed consent. As described herein, the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well-established, user-accessible, and recognized as in compliance with or above governmental/industry standards. Moreover, these parties will not distribute, sell, or otherwise share such information outside of any reasonable and legitimate purposes.

Users may, however, limit the degree to which such parties may access or otherwise obtain personal information. For instance, settings or other preferences may be adjusted such that users can decide whether their personal information can be accessed by various entities. Furthermore, while some features defined herein are described in the context of using personal information, various aspects of these features can be implemented without the need to use such information. As an example, if user preferences, account names, and/or location history are gathered, this information can be obscured or otherwise generalized such that the information does not identify the respective user.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first", "second", etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting", that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at a device including a display, a non-transitory memory and one or more processors coupled with the display and the non-transitory memory:
   displaying, on the display, a graphical user interface (GUI) that includes a set of data fields including a first data field that accepts a first type of data;
   detecting that a user of the device is interacting with a person different from the user of the device;
   obtaining the first type of data associated with the person; and
   displaying an affordance that, when activated, triggers the device to populate the first data field with the first type of data associated with the person.

2. The method of claim 1, wherein detecting that the user is interacting with the person comprises:
   obtaining, via an environmental sensor, environmental data indicating that the person is located in a physical environment of the device and that the user is in communication with the person.

3. The method of claim 1, wherein detecting that the user is interacting with the person comprises:
   obtaining electronic data indicating that the user is communicating with the person via the device.

4. The method of claim 1, wherein obtaining the first type of data associated with the person comprises:
   obtaining, via an image sensor, an image of the person;
   performing facial recognition on the image in order to identify the person; and
   querying a datastore for the first type of data associated with the person in response to identifying the person.

5. The method of claim 1, wherein obtaining the first type of data associated with the person comprises:
   obtaining, via a microphone, audible signal data corresponding to the person;
   performing voice recognition on the audible signal data in order to identify the person; and
   querying a datastore for the first type of data associated with the person in response to identifying the person.

6. The method of claim 1, wherein obtaining the first type of data associated with the person comprises:
   querying a social networking platform for the first type of data associated with the person; and
   receiving, from the social networking platform, the first type of data associated with the person.

7. The method of claim 1, further comprising:
   generating, in an autofill datastore, a new autofill entry that corresponds to the person that the user is interacting with; and
   storing the first type of data associated with the person in the new autofill entry that corresponds to the person.

8. The method of claim 7, further comprising:
   determining that an interaction between the user and the person has ceased; and
   in response to determining that the interaction between the user and the person has ceased, automatically purging the new autofill entry that corresponds to the person.

9. A device comprising:
   one or more processors;
   a non-transitory memory;
   one or more displays; and
   one or more programs stored in the non-transitory memory, which, when executed by the one or more processors, cause the device to:
   display, on the one or more displays, a graphical user interface (GUI) that includes a set of data fields including a first data field that accepts a first type of data;
   detect that a user of the device is interacting with a person different from the user of the device;
   obtain the first type of data associated with the person; and
   display an affordance that, when activated, triggers the device to populate the first data field with the first type of data associated with the person.

10. The device of claim 9, wherein detecting that the user is interacting with the person comprises:
    obtaining, via an environmental sensor, environmental data indicating that the person is located in a physical environment of the device and that the user is in communication with the person.

11. The device of claim 9, wherein detecting that the user is interacting with the person comprises:
    obtaining electronic data indicating that the user is communicating with the person via the device.

12. A non-transitory memory storing one or more programs, which, when executed by one or more processors of a device, cause the device to:
    display, on a display, a graphical user interface (GUI) that includes a set of data fields including a first data field that accepts a first type of data;
    detect that a user of the device is interacting with a person different from the user of the device;
    obtain the first type of data associated with the person; and
    display an affordance that, when activated, triggers the device to populate the first data field with the first type of data associated with the person.

* * * * *